(12) United States Patent
Matias

(10) Patent No.: US 8,056,871 B2
(45) Date of Patent: Nov. 15, 2011

(54) PORTABLE AND ADJUSTABLE STAND FOR LAPTOP COMPUTERS OR OTHER DEVICES

(75) Inventor: Edgar Matias, Toronto (CA)

(73) Assignee: The Matias Corporation, Newmarket, Ontario (CA)

( * ) Notice: Subject to any disclaimer, the term of this patent is extended or adjusted under 35 U.S.C. 154(b) by 541 days.

(21) Appl. No.: 11/735,523

(22) Filed: Apr. 16, 2007

(65) Prior Publication Data
US 2008/0251680 A1    Oct. 16, 2008

(51) Int. Cl.
*F16M 11/00* (2006.01)
*A47G 1/24* (2006.01)
(52) U.S. Cl. ........ 248/176.1; 248/454; 40/781; D14/447
(58) Field of Classification Search .................. 248/454, 248/455, 456, 166, 176.1; 361/688; D14/447; 108/44, 97, 42; 211/41.7, 135, 184, 183; 40/781, 761
See application file for complete search history.

(56) References Cited

U.S. PATENT DOCUMENTS

| | | | | |
|---|---|---|---|---|
| 1,485,786 A | * | 3/1924 | Kraft | 248/460 |
| 2,165,255 A | * | 7/1939 | Hamilton | 248/455 |
| 2,224,530 A | * | 12/1940 | Weinstein | 211/43 |
| 2,347,730 A | * | 5/1944 | Black | 40/357 |
| 3,272,183 A | * | 9/1966 | Craighead et. al. | 248/453 |
| 3,282,437 A | * | 11/1966 | Hansen | 211/41.7 |
| 5,141,196 A | * | 8/1992 | Arnold et al. | 248/397 |
| 5,511,758 A | | 4/1996 | Hsu | |
| 5,516,072 A | * | 5/1996 | Shinno | 248/460 |
| 5,607,135 A | | 3/1997 | Yamada | |
| D380,629 S | * | 7/1997 | Shinno | D6/449 |
| 5,915,661 A | | 6/1999 | Silverman et al. | |
| 6,076,787 A | | 6/2000 | Troyer | |
| 6,113,052 A | * | 9/2000 | Gentile et al. | 248/456 |
| 6,386,500 B1 | | 5/2002 | Dainoff et al. | |
| D468,542 S | * | 1/2003 | Hennekes et al. | D6/310 |
| 6,505,797 B1 | | 1/2003 | Dempsey | |
| 6,545,864 B2 | | 4/2003 | Davis, IV | |
| 6,682,040 B1 | | 1/2004 | MacEachern | |

FOREIGN PATENT DOCUMENTS

| | | |
|---|---|---|
| DE | 657337 C | 3/1938 |
| DE | 1921136 A1 | 11/1970 |
| NL | 2000183 C | 8/2006 |
| WO | 2004006717 A1 | 1/2004 |

OTHER PUBLICATIONS

Rudge, Tony, Examiner, Search Report, UK Intellectual Property Office, Jun. 15, 2008.

* cited by examiner

*Primary Examiner* — Anita M King
(74) *Attorney, Agent, or Firm* — Perry+Currier Inc.

(57) ABSTRACT

An adjustable stand raises the height of a computer display to eye level, for greater viewing comfort and better ergonomics. A unique design allows the stand to collapse down to two thin plates. When disassembled, the stand is approximately the size of a magazine, making it ideal for carrying in a laptop bag together with the laptop itself. Smaller versions for smaller devices (e.g., smartphones, video players, etc.) are possible. Other applications are also possible (e.g., holding photos, artwork, books, etc.).

24 Claims, 6 Drawing Sheets

PORTABLE AND ADJUSTABLE STAND FOR LAPTOP COMPUTERS OR OTHER DEVICES

BACKGROUND OF THE INVENTION

1. Field of the Invention

The present invention relates generally to portable stands and, more particularly, to stands for supporting laptop computers.

2. Description of the Related Art

Stands for laptops are well known in the art, including stands that are foldable or collapsible into a compact state for storage purposes.

For example, U.S. Pat. No. 5,511,758 discloses a folding stand having two parallel supports joined by a folding brace for supporting a notebook computer, The folding brace includes two bracing bars pivotably joined by a link and pivotably connected between the supports. The supports have a respective sloping top wall for supporting the notebook computer in a tilted position for comfortable operation and an elongated bottom opening for receiving one bracing bar when the folding brace is folded up to collapse the stand.

U.S. Pat. No. 5,607,135 discloses a foldable one-piece tablet stand having a base section, a back rest section which can be raised and lowered into the base section, and a pair of protrusions which can be raised and lowered into the base and disposed at a front part of the base section so that when both the back rest section and protrusions are in the raised conditions, a tablet will be held by the back rest section with a bottom of the tablet held by the base section and secured by the pair of protrusions. A holder section is foldable into the base section and hinged on the back of the back rest section and held on parts of the base section so that the back rest section is fixed thereby.

U.S. Pat. No. 5,915,661 discloses a collapsible desk stand for a portable computer for allowing variation in viewing angles of the computer display, and the ability to connect the portable computer to external, peripheral devices. The portable computer can be positioned on the stand so that both right-handed and left-handed persons can position the portable computer so that data entry is most convenient. The stand includes a feature to allow it to be locked in its collapsed position. An adjustable handstrap assembly is also provided.

U.S. Pat. No. 6,076,787 discloses a portable stand for holding a laptop computer, which is capable of folding to a compact state for storage purposes. The portable stand includes an elongated base member with a pair of base feet to rest on a floor surface, a set of vertically extending post members, and an elongated platform member with a pair of support wings to hold the laptop computer in a position ready for use. The base feet are moveably attached to the elongated base member to swing from a compact position juxtaposed the base member to an extended position at substantially right angles to the base member. The post members are moveably attached to one another, moveably attached to the elongated base member, and moveably attached to the elongated platform member. The base feet and the support wings swing substantially horizontally from the base member and the support member, respectively, while the post members swing substantially vertically relative to one another and to the elongated base and support members.

U.S. Pat. No. 6,505,797 discloses a laptop computer stand adapted to be mounted on a chair or similar vertical structure that includes a horizontal edge. A hanging frame assembly includes a pivotally mounted arched arm at one end that receives the edge of a chair in one extreme position and is retractable within the hanging frame assembly in the other extreme position. The hanging frame assembly is pivotally mounted to the base frame assembly that receives the hanging frame assembly therein is one extreme position and at a substantially rectangular relationship with the hanging frame assembly in the other extreme position. A pivotally mounted leg member is used to raise the base frame assembly to a predetermined angle in one extreme position, and as a spacer in another position while the other extreme position the leg member is housed with the hanging frame space. A retainer member pivotally mounted flange is mounted to the distal end of the base frame assembly to serve as a stopper for a laptop to prevent it from sliding down.

U.S. Pat. No. 6,545,864 discloses a notebook computer stand for a notebook computer, having a U-shaped pocket and a support. The U-shaped pocket receives the relatively thicker frame portion of the notebook computer housing the keyboard, the CPU, the mouse, and related hardware. The notebook computers hinged display is deployed above the pocket for ease of viewing. In one embodiment, the notebook computer stand includes a storage compartment, cable slots for routing cables connected to the notebook computer, and height adjusters for varying the height of the computer stand and, indirectly, the viewing angle of the display.

U.S. Pat. No. 6,682,040 discloses a stand for supporting a laptop computer at different tilt angles. According to one embodiment, a top plate is included having a trapezoidal shape including a number of riser clusters arranged along a narrower parallel side of the top plate. Each one of the riser clusters may be configured to fit within a riser element and hold the riser element. A bottom plate with a trapezoidal shape may be connected to the top plate by a connector that allows the top plate to rotate relative to the bottom plate. A number of laptop supports may be connected to a wider parallel side of the top plate and configured to support one end of the laptop in a slip-resistant manner. At least two riser elements may be stacked respectively on at least two riser clusters. At least two riser caps may be stacked respectively over the at least two riser elements to support an opposite end of the laptop in a slip-resistant resistant manner and at an elevation higher than the one end of the laptop. A variable tilt angle may be imparted by adding or removing riser elements from the stacks to vary convective cooling of the laptop and keyboard tilt.

SUMMARY OF THE INVENTION

It is an aspect of the present invention to provide an adjustable support structure for a laptop computer, which permits the computer display to be raised to eye level, and which collapses down flat for travel.

According to another aspect of the invention, a ventilation air hole is provided to allow greater airflow beneath the laptop, so as to better dissipate heat generated by the laptop during use.

The adjustable support structure according to an exemplary embodiment is inexpensive to manufacture and easy to assemble, with few component parts.

The above aspects can be attained by a stand, having a first planar portion with a lip on an edge thereof, and second planar portion having a plurality of slots oriented at different angles relative to a surface thereof and sized so that the first planar portion may be inserted therein, whereby the height of the stand is adjustable by selecting respective ones of the slots into which the first planar portion is inserted.

These together with other aspects and advantages which will be subsequently apparent, reside in the details of construction and operation as more fully hereinafter described

BRIEF DESCRIPTION OF THE DRAWINGS

FIG. 2, comprising

FIG. 3, comprising

FIG. 4, comprising

DETAILED DESCRIPTION OF THE PREFERRED EMBODIMENTS

An exemplary embodiment of the invention is set forth below. However, a person of skill in the art will appreciate that other embodiments and variations may be possible.

Generally, two plates are provided which, when assembled, act as an adjustable stand for a laptop, smartphone, or similarly-shaped object. When disassembled, the two plates occupy a space approximately equal to that of a magazine or book, making them easy to stow when traveling.

Figure 1:
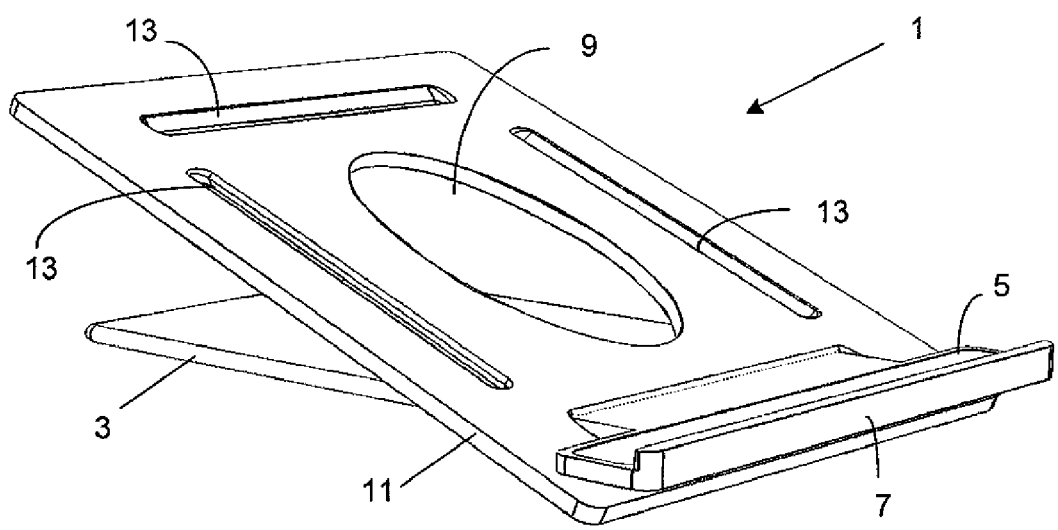
FIG. 1 is a perspective view of a stand, in its assembled state, according to an embodiment of the invention.
Figure 2A:
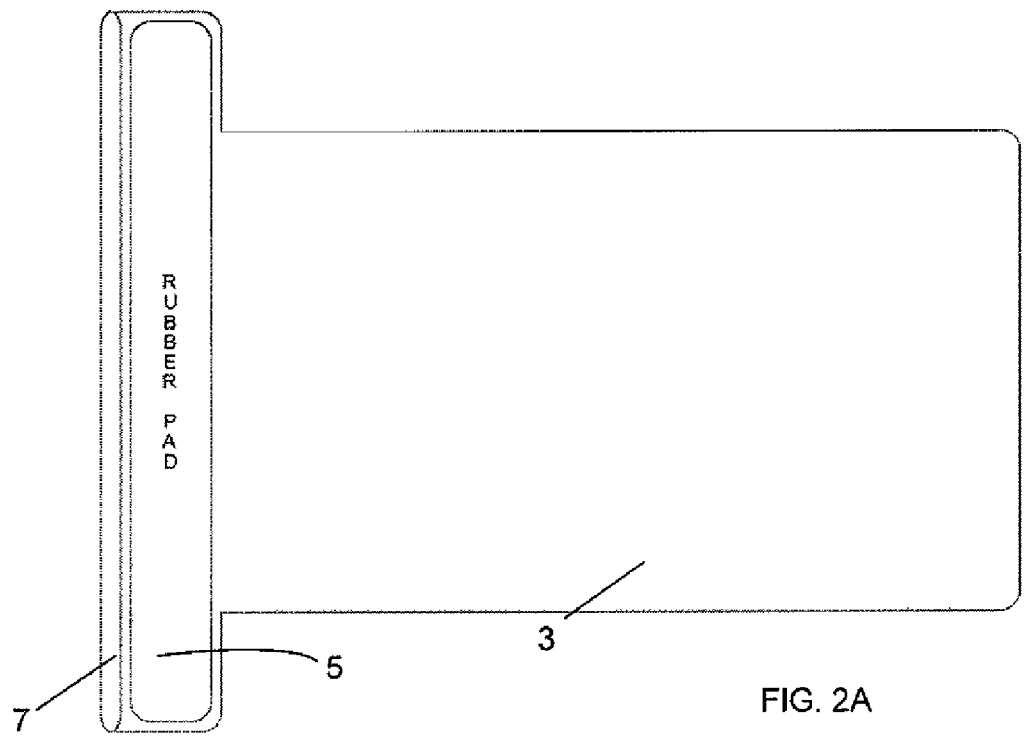
FIGS. 2A, 2B and 2C, shows an edge plate for the embodiment of FIG. 1.
Figure 2B:
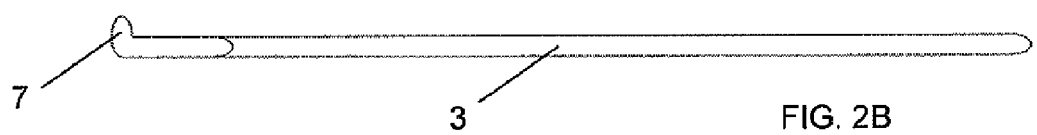
Figure 2C:
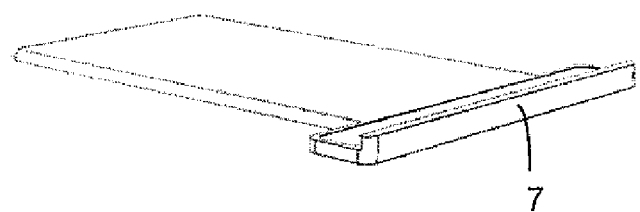

FIG. 1 shows a first embodiment of stand 1 according to the present invention, when fully assembled. A first planar surface 3, referred to herein as an "Edge Plate", is shown in greater detail with reference to FIG. 2, for supporting a laptop (see FIG. 6). The planar surface 3 has a rubber pad 5, shown best in FIG. 2A, on which the front edge of the laptop sits. A lip 7 forms a slightly raised "ledge" immediately in front of the rubber pad 5, to prevent the laptop from sliding off of the rubber pad. A large oval hole 9 allows air to flow freely beneath the laptop, for better ventilation and a cooler, quieter running laptop.

Figure 3A:
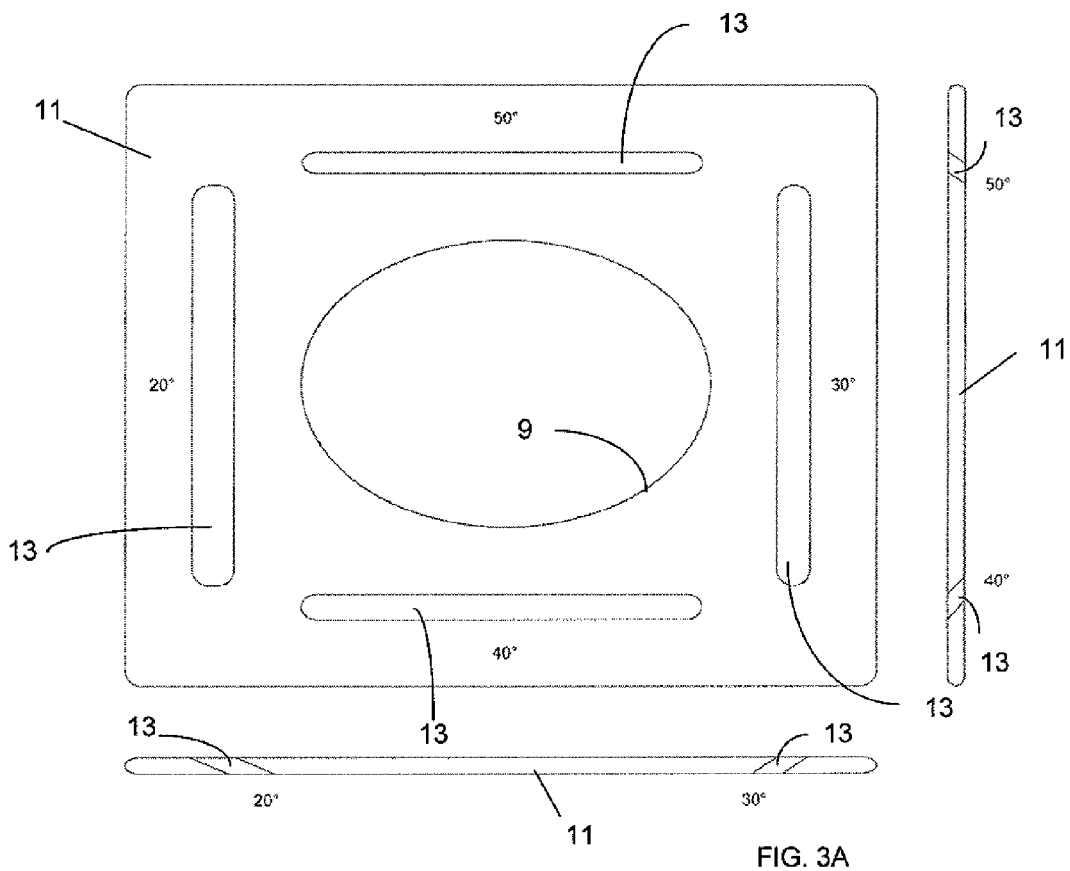
FIGS. 3A and 3B, shows a back plate for the embodiment of FIG. 1.
Figure 3B:
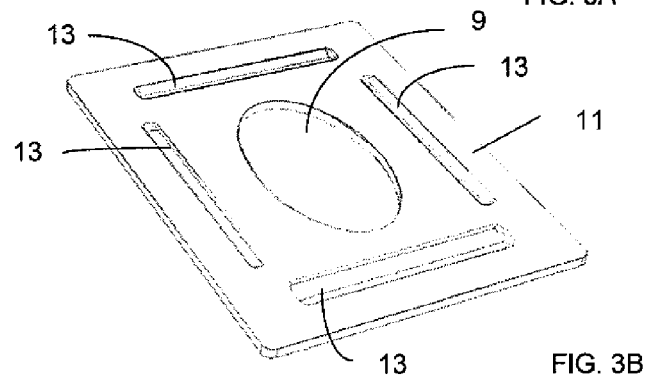

A second planar surface 11, referred to herein as a "Back Plate", is shown in greater detail with reference to FIG. 3, having four slots 13 along respective edges, as shown best in FIG. 3A. The Edge Plate 3 is inserted into one of the four slots 13 to assemble the stand.

Figure 4A:
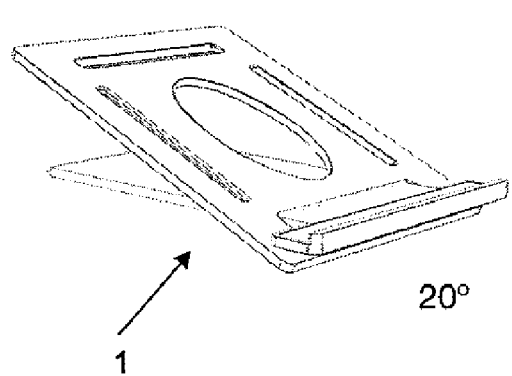
FIGS. 4A, 4B and 4C, shows adjustment of the stand of the embodiment of FIG. 1 to a plurality of different angles.
Figure 4B:
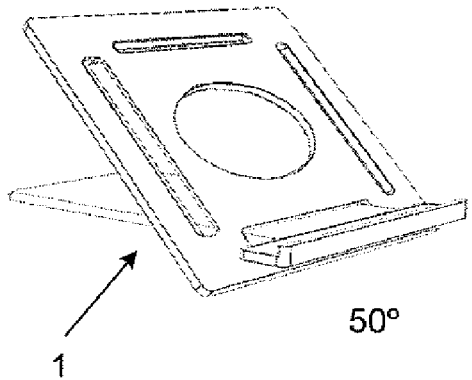
Figure 4C:
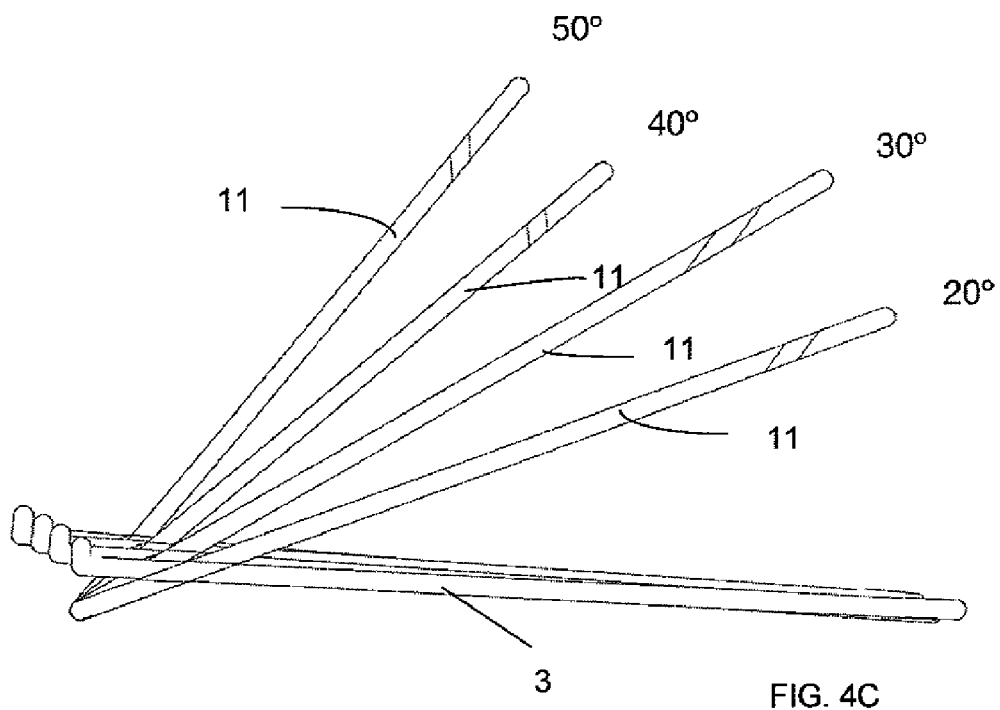

FIG. 4 shows the stand 1 adjusted to various angles, by inserting the first planar surface 3 into respective different ones of the angled slots 13, and the resulting adjustment of stand height.

Figure 5:
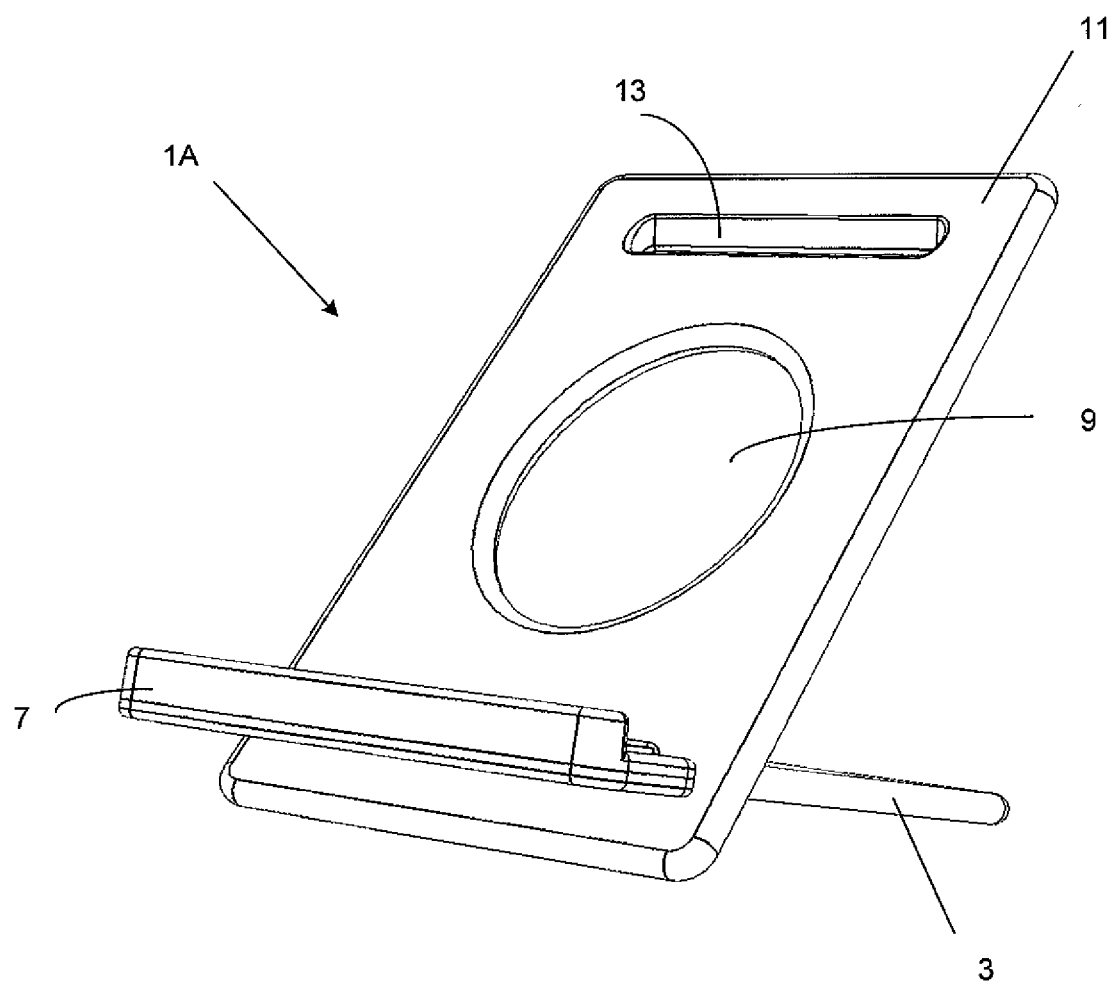
FIG. 5 is a perspective view of a stand, in its assembled state, according to an alternative embodiment of the invention.

FIG. 5 shows an alternative embodiment of smaller size stand 1A (e.g. credit-card-sized) for use with objects smaller than a typical laptop computer, such as smartphones, portable video players, or other small devices. Only two slots 13 are provided in this alternative embodiment, with preferred slot angles of 40° and 50°.

Figure 6:
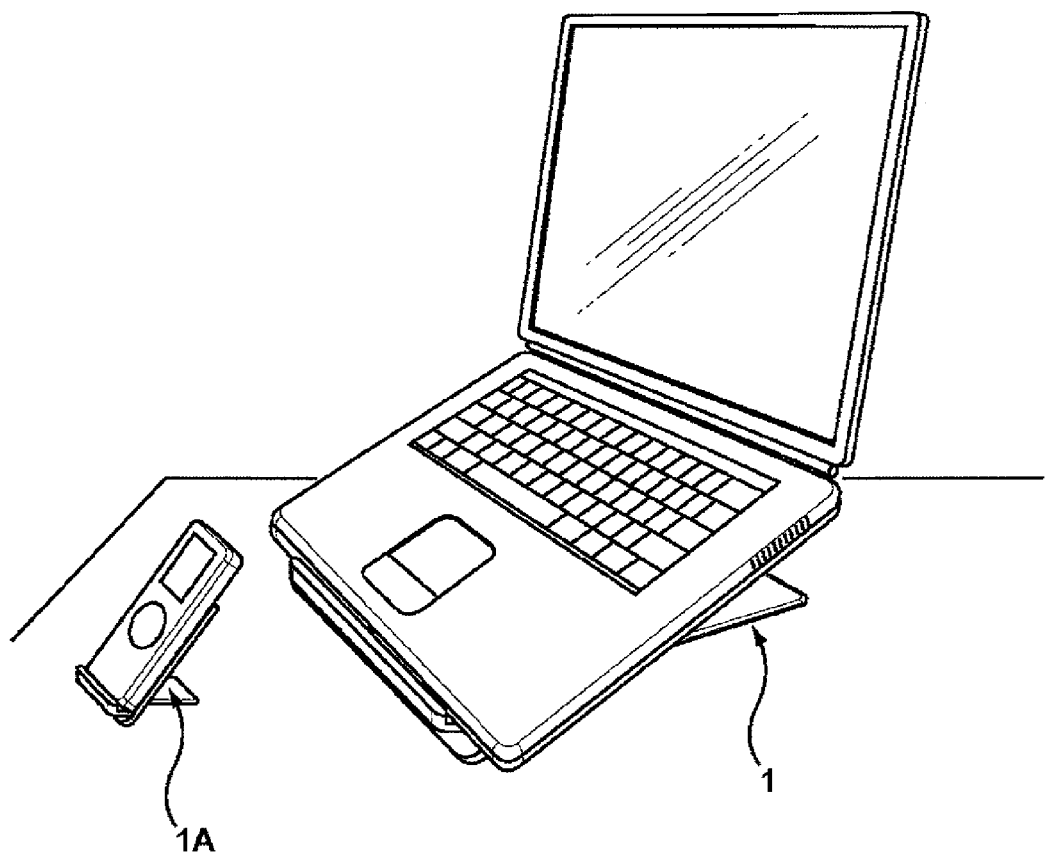
FIG. 6 is a perspective view of the stands shown in FIGS. 1 and 5, in use, holding portable entertainment device and laptop computer, respectively.

FIG. 6 shows the two embodiments of FIG. 1 and FIG. 5 in use, the stand: one holding a laptop, and another holding a portable music/video device.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A stand, comprising:
    a first planar portion for supporting an article and having a lip on an edge thereof for preventing said article from sliding off said first planar portion, and
    a second planar portion having a plurality of slots oriented at different angles relative to a planar surface thereof and sized so that said first planar portion may be inserted therein, whereby the height of said stand is adjustable by selecting respective ones of said slots into which said first planar portion is inserted.

2. The stand of claim 1, wherein said slots are disposed adjacent edges of said second planar portion.

3. A stand, comprising:
    a first planar portion for supporting an article and having a lip on an edge thereof for preventing said article from sliding off said first planar portion;
    a second planar portion having a plurality of slots oriented at different angles relative to a planar surface thereof and sized so that said first planar portion may be inserted therein; and
    at least one ventilation hole through said second planar portion; whereby the height of said stand is adjustable by selecting respective ones of said slots into which said first planar portion is inserted.

4. The stand of claim 3, wherein said slots are disposed adjacent edges of said second planar portion.

5. The stand of claim 1, wherein length and width dimensions of said first planar portion and said second planar portion are similar such that when said stand is disassembled said portions may be oriented to lie flat against each other, for compact carriage and storage.

6. The stand of claim 2, wherein length and width dimensions of said first planar portion and said second planar portion are similar such that when said stand is disassembled said portions may be oriented to lie flat against each other, for compact carriage and storage.

7. The stand of claim 3, wherein length and width dimensions of said first planar portion and said second planar portion are similar such that when said stand is disassembled said portions may be oriented to lie flat against each other, for compact carriage and storage.

8. The stand of claim 4, wherein length and width dimensions of said first planar portion and said second planar portion are similar such that when said stand is disassembled said portions may be oriented to lie flat against each other, for compact carriage and storage.

9. A stand, comprising:
    a first planar portion for supporting an article and having a lip on an edge thereof for preventing said article from sliding off said first planar portion, and a second planar portion having a plurality of slots oriented at different angles relative to a planar surface thereof and sized so that said first planar portion may be inserted therein, wherein said plurality of slots is four, respectively oriented at 20°, 30°, 40° and 50° to said planar surface;
    whereby the height of said stand is adjustable by selecting respective ones of said slots into which said first planar portion is inserted.

10. The stand of claim 9, wherein said slots are disposed adjacent edges of said second planar portion.

11. The stand of claim 3, wherein said plurality of slots is four, respectively oriented at 20°, 30°, 40° and 50° to said planar surface.

12. The stand of claim 4, wherein said plurality of slots is four, respectively oriented at 20°, 30°, 40° and 50° to said planar surface.

13. The stand of claim 9, wherein length and width dimensions of said first planar portion and said second planar portion are similar such that when said stand is disassembled said portions may be oriented to lie flat against each other, for compact carriage and storage.

14. The stand of claim 13, wherein said slots are disposed adjacent edges of said second planar portion.

15. The stand of claim 7, wherein said plurality of slots is four, respectively oriented at 20°, 30°, 40° and 50° to said planar surface.

16. The stand of claim 8, wherein said plurality of slots is four, respectively oriented at 20°, 30°, 40° and 50° to said planar surface.

17. A stand, comprising:
- a first planar portion for supporting an article and having a lip on an edge thereof for preventing said article from sliding off said first planar portion, and a second planar portion having a plurality of slots oriented at different angles relative to a planar surface thereof and sized so that said first planar portion may be inserted therein, wherein said plurality of slots is two, respectively oriented at 40° and 50° to said planar surface;
- whereby the height of said stand is adjustable by selecting respective ones of said slots into which said first planar portion is inserted.

18. The stand of claim 17, wherein said slots are disposed adjacent edges of said second planar portion.

19. The stand of claim 3, wherein said plurality of slots is two, respectively oriented at 40° and 50° to said planar surface.

20. The stand of claim 4, wherein said plurality of slots is two, respectively oriented at 40° and 50° to said planar surface.

21. The stand of claim 17, wherein length and width dimensions of said first planar portion and said second planar portion are similar such that when said stand is disassembled said portions may be oriented to lie flat against each other, for compact carriage and storage.

22. The stand of claim 21, wherein said slots are disposed adjacent edges of said second planar portion.

23. The stand of claim 7, wherein said plurality of slots is two, respectively oriented at 40° and 50° to said planar surface.

24. The stand of claim 8, wherein said plurality of slots is two, respectively oriented at 40° and 50° to said planar surface.

* * * * *